May 18, 1965 F. P. ADLER 3,183,855
LOAD RETAINER
Filed Feb. 26, 1962 6 Sheets-Sheet 1
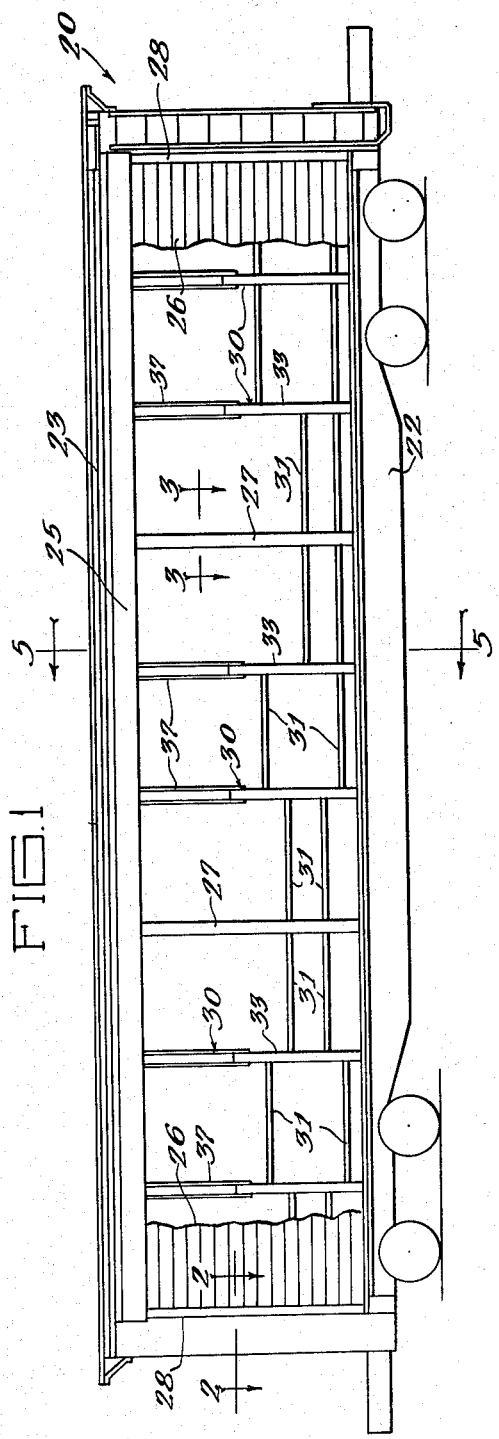
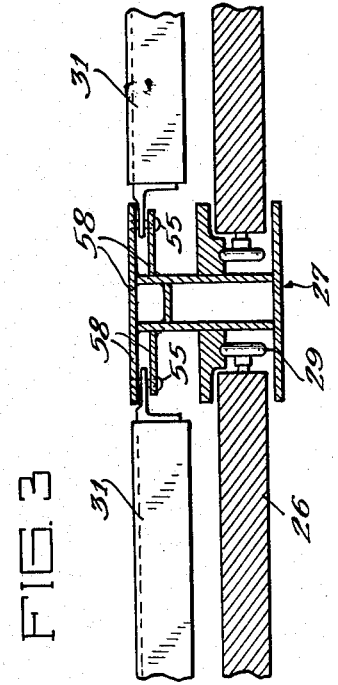
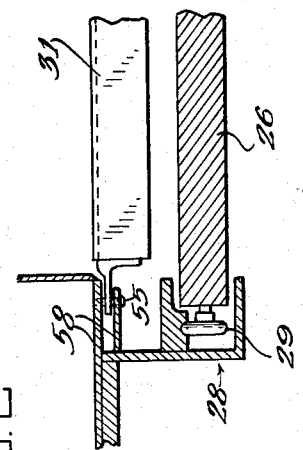
Inventor:
Franklin P. Adler
By: Zabel, Baker, York,
Jones & Dithmar
Attorneys

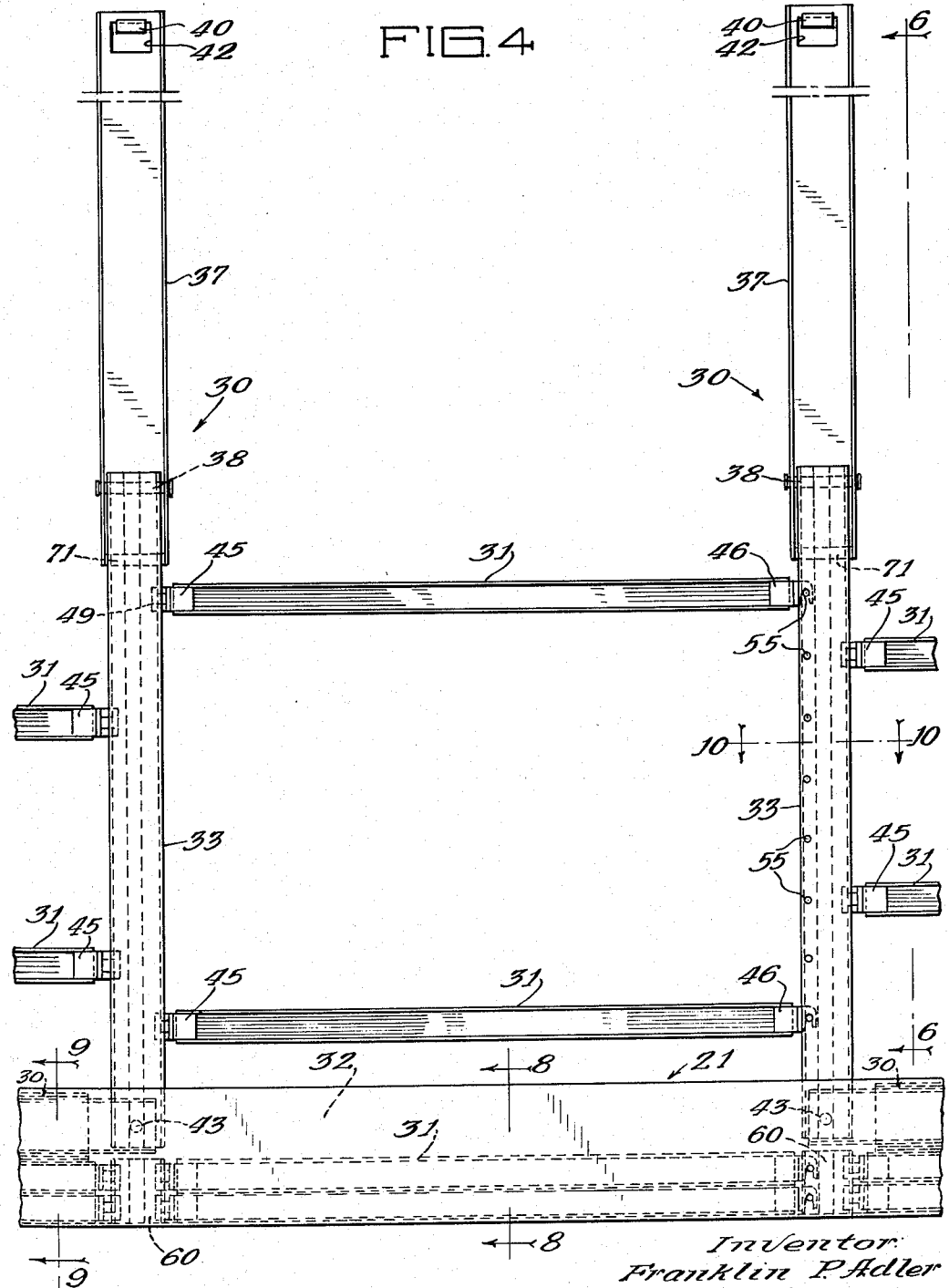

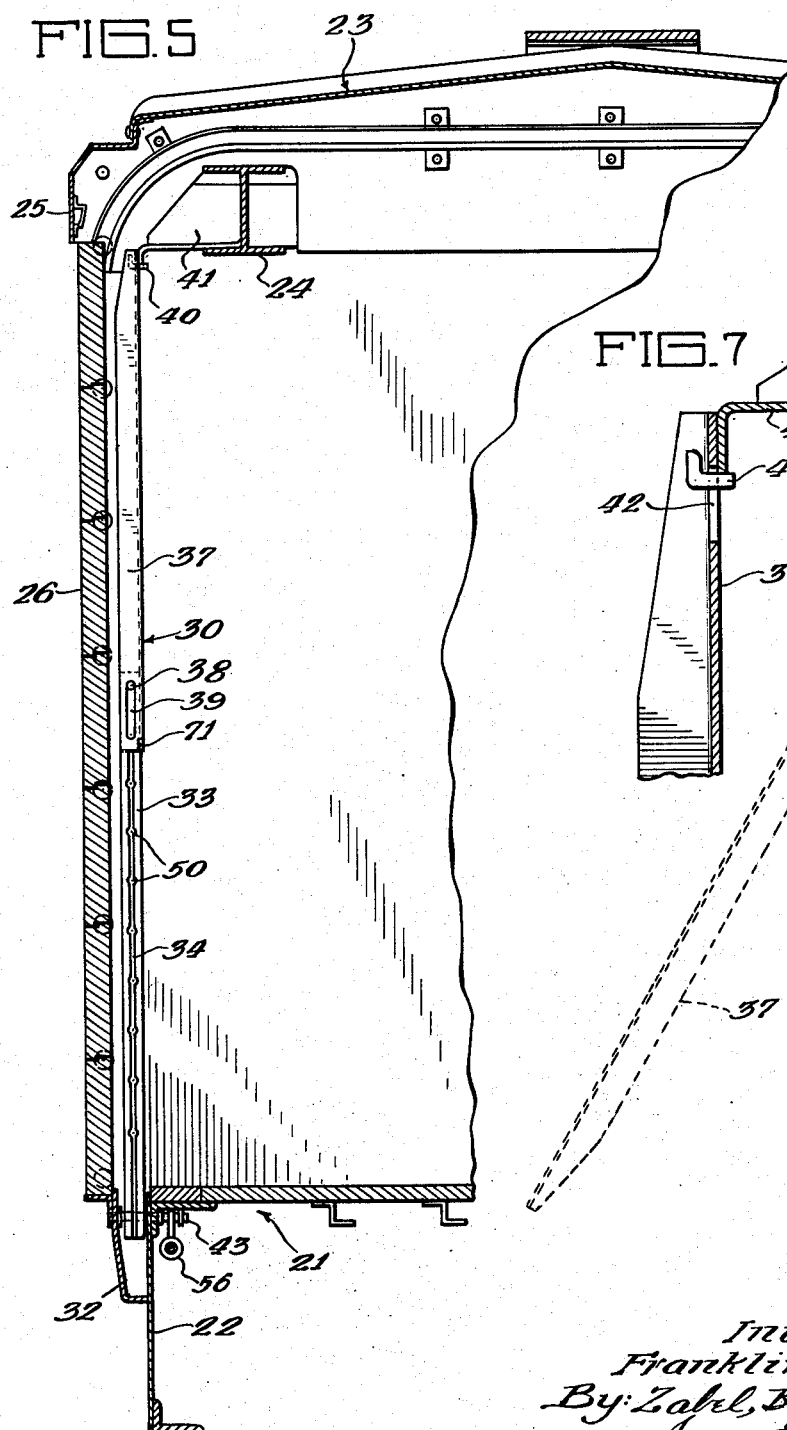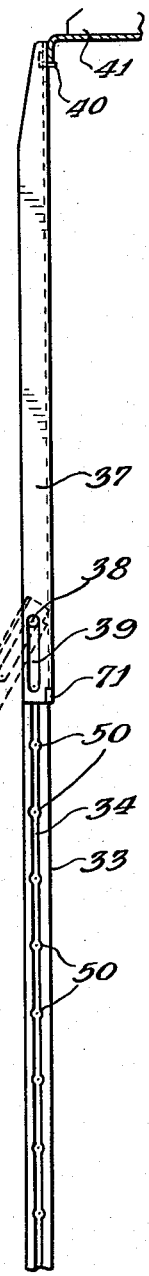

May 18, 1965 F. P. ADLER 3,183,855
LOAD RETAINER
Filed Feb. 26, 1962 6 Sheets-Sheet 4
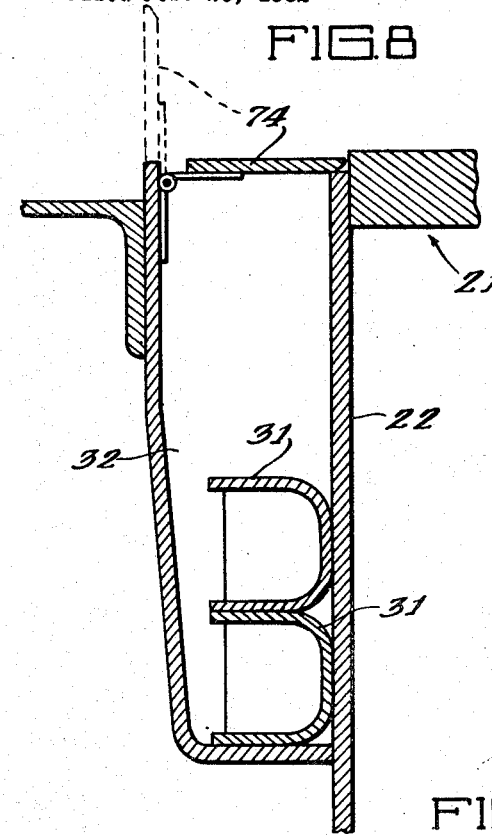
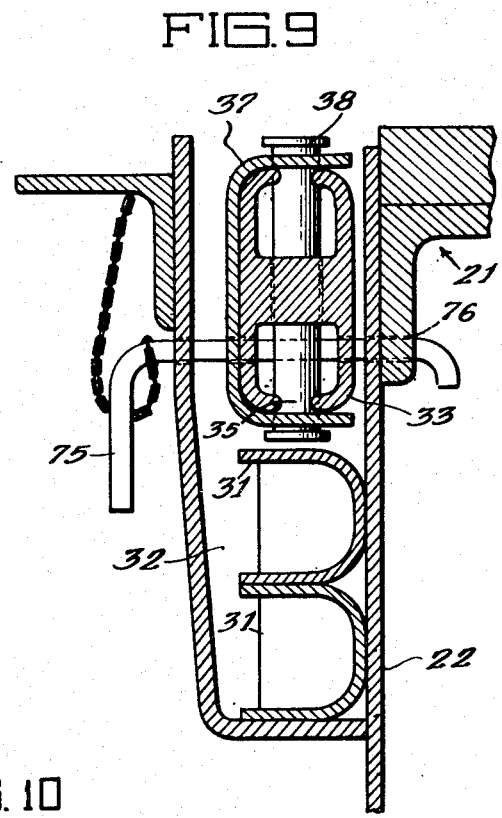
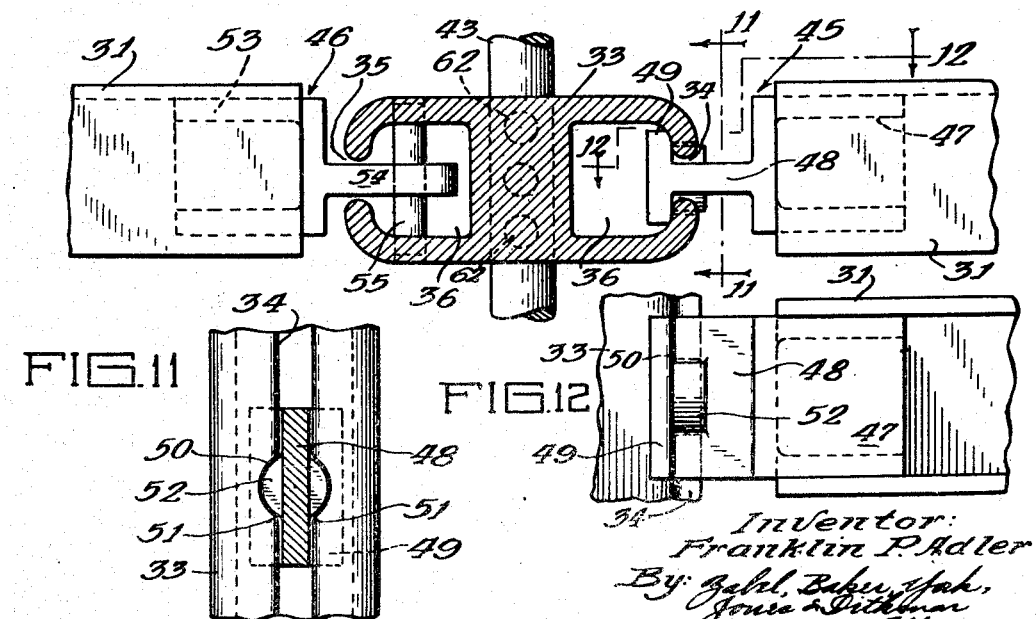
Inventor:
Franklin P. Adler
By: Zabel, Baker, York,
Jones & Dithmar
Attorneys May 18, 1965  F. P. ADLER  3,183,855
LOAD RETAINER
Filed Feb. 26, 1962  6 Sheets-Sheet 5
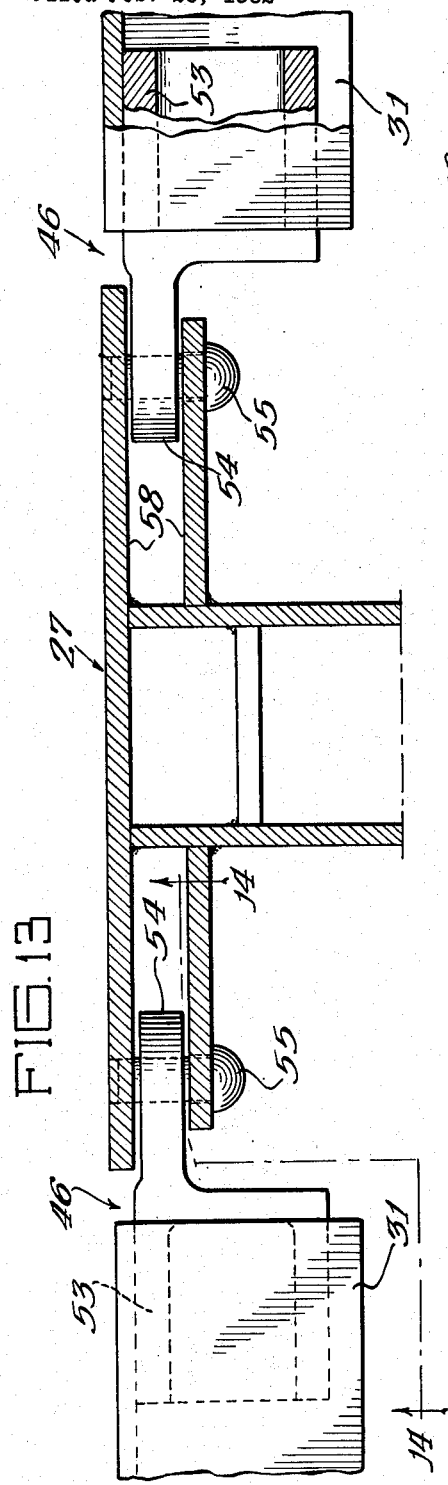
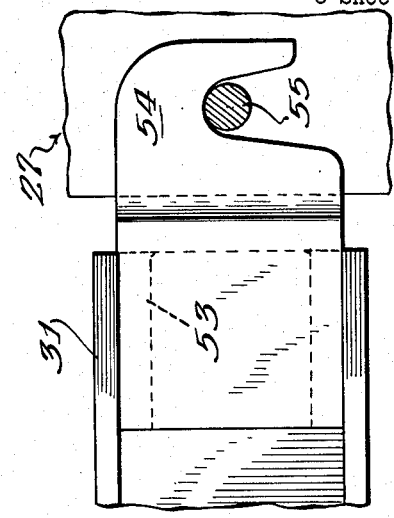
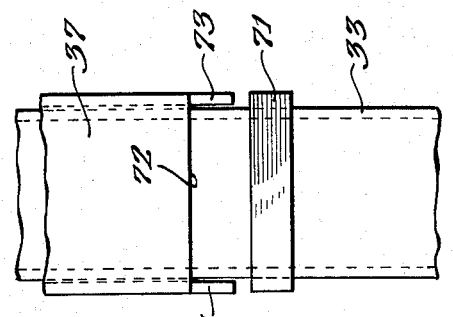
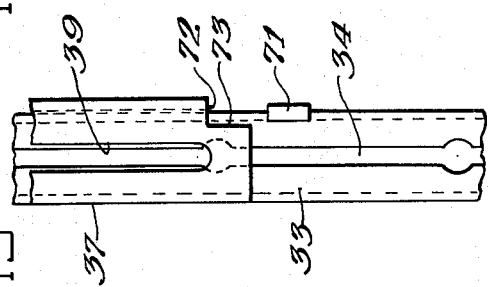
Inventor:
Franklin P. Adler
By: Zabel, Baker, York,
Jones & Dithmar
Attorneys

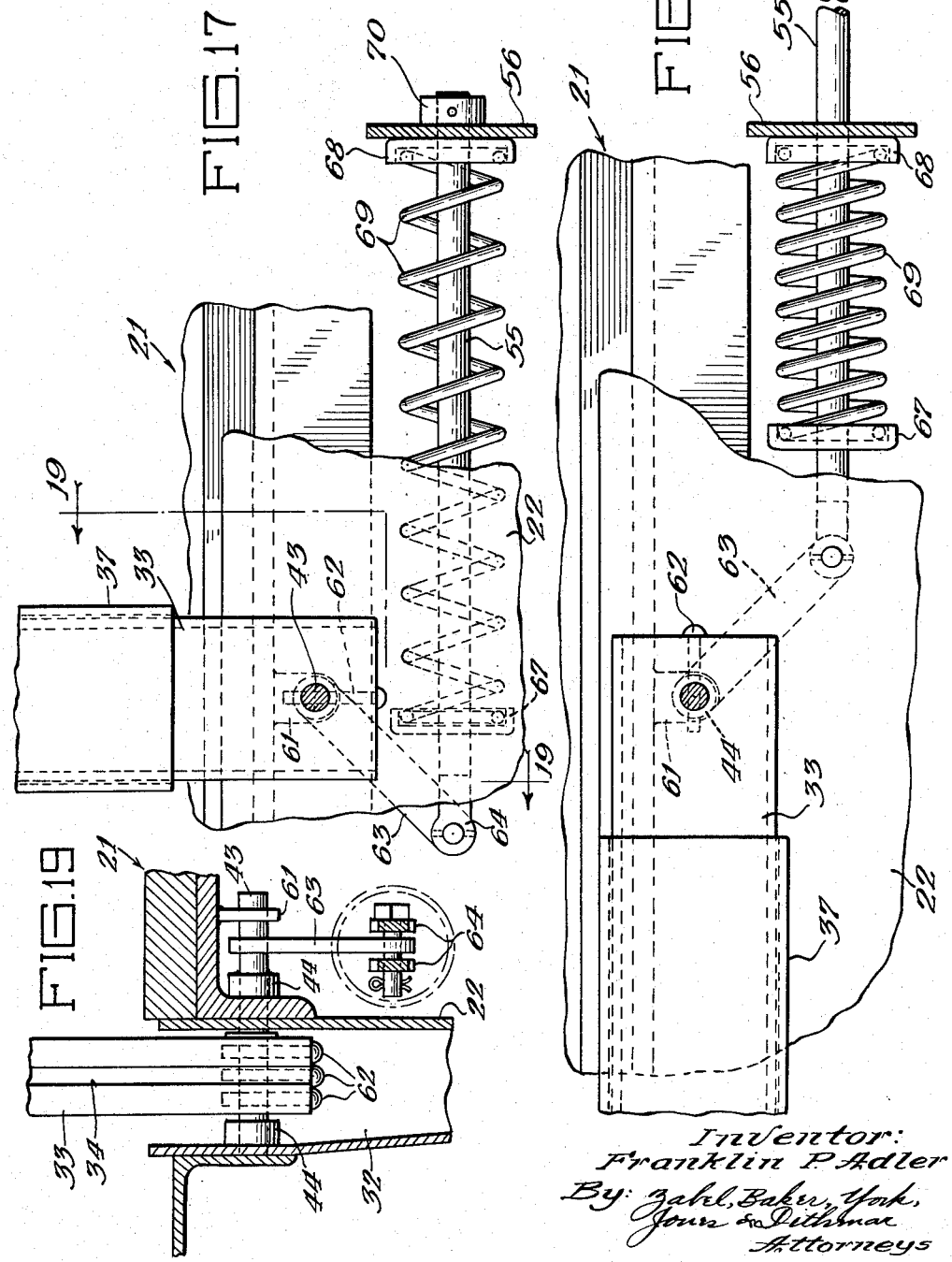

ial No. 129,937, filed August 2, 1960.
United States Patent Office 3,183,855
Patented May 18, 1965

3,183,855
LOAD RETAINER
Franklin P. Adler, Michigan City, Ind., assignor to Pullman Incorporated, Chicago, Ill., a corporation of Delaware
Filed Feb. 26, 1962, Ser. No. 175,761
13 Claims. (Cl. 105—369)

This invention relates to improvements in load retainers for cargo carriers, such as railway cars or the like.

The purpose of a load retainer is to take up any transverse forces arising from load shifting in cases where the door structure needs this protection. My present invention is particularly well adapted for use with open side railway cars of either the fixed or removable door post types such, as for example, as that disclosed in copending application of Adler, Candlin, Jr., and Van der Sluys, Serial No. 129,937, filed August 2, 1960.

It is an object of my invention to provide a load retainer which is collapsible into the floor structure of the cargo carrier and in which the various parts of the load retainer are nonseparable one from the other and from the structure of the cargo carrier.

To take railway cars as an example, a load retainer which must be physically removed and placed on the loading dock is of little practical utility due to the strong possibility of failure on the part of the operators to replace the load retainer in the empty car after unloading. In other words, no car owner is going to incur the expense of equipping a car with load retainers where the chances are in the course of a month or two the load retainer will repose on a loading dock many hundreds of miles away from the car.

In the design of such a nonseparable load retainer, the problem arises as to just where the same may be disposed so that it does not cut down the effective area of the door opening.

According to my invention, I provide a pocket in the floor structure right beneath the load retainer and running parallel to the door to provide a storage position into which the load retainer can be collapsed. The load retainer is in the form of vertical standards and horizontal rails, and the nonseparable feature is obtained by permanently locking the rails and the standard at one end of the rail in vertically sliding relationship so that the rail will be movable between an elevated position and the storage position provided by the pocket.

Another object of my invention is to provide a load retainer in which the standards are provided with a jointed extension so that an arrangement may be provided wherein the spacing between the standards is less than the height of the door opening.

According to my invention, each standard supports one end of two sets of rails, the rails of one set extending in one direction, and the rails of the other set extending in the other direction. In some instances, it means that a given standard is called upon to provide two types of support, the interlocking or head end support for one set of rails, and the free end of support for the other set of rails.

It is a further object of my invention to provide a standardized type of standard construction in which some standards provide the two different types of support mentioned, and in which other standards, with only minor changes, provide the same type of support for both sets of rails.

A still further object is to provide a retainer system which is adapted for installation in door openings of various widths, such as those requiring only two or more between the door posts, or those requiring two or more standards between the door posts, and in which system the door post itself can be utilized for providing the free end support for a set of rails.

Still another object is to provide an improved load retainer which is fairly simple to operate, and in which counterbalancing means are provided to facilitate the elevation of the standard and to maintain it in elevated position during the period of manipulation, thus permitting the load retainer to be set up or taken down by only one man.

Other objects, features and advantages will become apparent as the description proceeds.

With reference now to the drawings in which like reference numerals designate like parts:

FIG. 1 is a side elevation of a railway car equipped with a preferred embodiment of my invention, the doors being broken away;

FIGS. 2 and 3 are plan sections taken along lines 2—2 and 3—3 of FIG. 1, and showing the relationship of the load retainer, the doors, and the door posts;

FIG. 4 is an elevation of a portion of the load retainer shown in FIG. 1, the storage position of the parts being shown in broken lines;

FIG. 5 is a vertical section taken along line 5—5 of FIG. 1;

FIG. 6 is an end view taken along line 6—6 of FIG. 4 showing a changed position in broken lines;

FIG. 7 is an enlarged section of the upper end of the jointed extension;

FIG. 8 is a vertical section taken along line 8—8 of FIG. 4 showing the rails in the storage position;

FIG. 9 is a vertical section taken along line 9—9 of FIG. 4 showing both the standard and the rails in their storage position;

FIG. 10 is a plan section taken along line 10—10 of FIG. 4;

FIG. 11 is a vertical transverse section taken along line 11—11 of FIG. 10;

FIG. 12 is a vertical longitudinal section taken along lines 12—12 of FIG. 10;

FIG. 13 is an enlarged plan section similar to FIG. 3;

FIG. 14 is a vertical longitudinal section taken along lines 15—15 of FIG. 13;

FIG. 15 is an enlarged detail showing the joint lock of FIG. 6;

FIG. 16 is a rear elevation of FIG. 15;

FIG. 17 is a detailed view of the counterbalance mechanism;

FIG. 18 is a view similar to FIG. 17 but showing a changed position of the parts;

FIG. 19 is a vertical section taken along lines 19—19 of FIG. 17.

FIGS. 1 and 4 show a car 20 having a floor structure 21 which includes a side sill 22, and a roof structure 23 which includes a top beam 24 and a side plate 25. The car is fitted with three roll up doors 26 which are mounted for vertically sliding movement in intermediate door posts 27 and end door posts 28. The door posts provide tracks for the rollers 29 of each door section, as shown in FIGS. 2 and 3.

The load retainer comprises a plurality of vertical standards 30 and horizontal rails 31, shown in FIGS. 1 to 5. When the parts are collapsed they are received in a pocket 32 in the floor structure 21 (FIG. 5).

In the embodiment shown, the standards 30 are jointed and comprise a lower part 33 and an upper part 37 which are connected by a hinge pin 38. The lower part 33 is in the form of a shape provided with oppositely facing slots 34 and 35, as shown in FIG. 10. Preferably the part 33 is an aluminum extrusion which is formed with two cavities 36, and the cross section is bilaterally symmetrical for reasons hereinafter set forth.

The upper part 37 is in the form of a channel, the lower end of which is provided with vertical closed slots 39 formed in the flanges thereof. A hinge pin 38 is mounted in the part 33 so that when the upper part is moved from the dotted line position of FIG. 6 into the solid line position, the parts will telescope so as to provide the overlapping engagement shown in solid lines in FIG. 6.

The standard 30 extends from the floor structure up to the roof structure, a lug 40 on a bracket 41 extending through a slot 42 in the upper part 37 as shown in FIG. 7, the swinging and telescopic arrangement provided by the elements 38 and 39 facilitating the manipulation of parts which results in the interlocking engagement of the lug 40 with the part 37.

The lower end of the part 33 extends into the pocket 32 and is secured to a shaft 43 which is journaled in bearings 44 mounted on the walls of the pocket (FIG. 19). It will be observed from comparing FIGS. 6 and 4 that in collapsing the load retainer, the channel part 37 is folded downwardly about a longitudinal axis until it coincides with and embraces the shaped part 33; then the folded parts are swung downwardly about the tranverse axis of the shaft 43 into the storage position shown in broken lines in FIG. 4.

The rails 31 are supported at each end by the standards 30, but as previously indicated, the head end of each rail interlocks with a head end slot 34 in vertically sliding relationship. Each rail 31 is in the form of a channel, one end of which is provided with a head fitting 45 for cooperation with a head end slot 34, and the other end of which is provided with a free end fitting 46. The head end fitting 45 is in the form of a hollow body or plug 47 which is welded in the channel of the rail 31, a neck 48 extending from the body, and a head 49 at the end of the neck, this arrangement being shown in FIGS. 10 and 12. The head end slot 34 is provided with a plurality of enlarged slot portions 50 in FIGS. 6 and 11 each of which provides shoulders 51 which interlock with a boss 52 on the neck 48, adjacent the head. For example, portions 50 may be formed by a drill, and the boss 52 may be of circular cross section. According to this arrangement, the head and the rail 31 may be locked in any one of the enlarged portions 50 merely by pulling out on the rail.

The free end fitting 46 includes a body or plug 53 welded to the rail channel 31 and a hook 54 as shown in FIGS. 10 and 14. The hook fits over a cross pin 55 located in the free end slot 35, as shown in FIG. 10, the dimensions being such that this occurs only after the rail has been pulled out so that the boss 52 engages the shoulders 51.

It will thus be seen that the foregoing arrangement provides a means by which one end of the rail is permanently connected to one of the standards, but the connection permits sliding movement of the rail between the elevated and storage positions shown in FIG. 4 and also permits the longitudinal and swinging movement for locating and securing each end in any one of several adjusted positions. When the free end is secured, the hook arrangement prevents such longitudinal rail movement as would result in disengagement of the boss 52 from the shoulders 51.

Both the end posts 28 and the intermediate door posts 27 include spaced vertical members 58 which also support a cross pin 55. Thus, the door posts also serve as a support for the free end of a set of rails, as shown in FIGS. 1 and 3.

Disposed in the pocket 32, which preferably runs the full length of the car, are holders 60 which cooperate with the rails 31 in the same manner as do the shaped parts 33. These holders are short lengths of a shape or extrusion identical to 33 and serve to maintain the rails against longitudinal displacement when the rails are in their storage position. The holders 60 are aligned with the parts 33 so that each rail will move with facility into or out of its storage position. The spacing between the parts 33 and 60 is preferably less than the vertical dimension of the head 49 so that there is no way by which the head end of the rail can be disengaged from the remaining parts of the load retainer system.

Counterbalance means are provided to facilitate the location of the standards, as shown in FIGS. 17 to 19. The inner end of shaft 43 is extended beyond the bearing 44 and received in a bracket 61. Pins 62 securely fasten the part 33 to the shaft 43. A crank 63 is suitably keyed or pinned to the shaft 43. The outer end of the crank is connected to a yoke 64 carried at the end of a longitudinally sliding guide bar 65, the other end of the guide bar extending through a reaction plate 66 which is firmly welded to the inner surface of the side sill 22. A cup 67 is suitably secured to the left end of the guide bar as viewed in FIGS. 17 and 18 and a second cup 68 is mounted on the reaction plate 66. A strong coil spring 69 is confined between the cups 67 and 68. Therefore, the force of the spring 69 operates through the crank 63 and shaft 43 to urge the standard 30 into its elevated position. The forces involved are linear so that the standard 30 will remain in its storage position without any difficulty, the strength of the spring being such that its counterbalancing effect becomes appreciably noticeable at about the 45° position. A stop collar 70 on the guide bar 65 determines the final position of the standard, which should coincide with the vertical, with the result that the operator does not need to be concerned with the dropping of the standard, but can utilize both hands in the unfolding operation of the upper part 37.

As shown in FIGS. 15 and 16, a joint lock is provided which maintains the standard 30 against inwardly buckling movement. The overlap of the parts is arranged to prevent outwardly buckling movement; since the overlap is of 8 to 10 inches for a 9 foot standard, a very strong anti-buckling arrangement is provided which opposes the transverse forces of the load.

However, the load may not always engage the load retainer so as to prevent inward buckling, and for that reason the joint locks of FIGS. 15 and 16 are provided. The lower part 33 is grooved to receive a steel cross bar 71 which is welded in place. The web of the channel of the upper part 37 is cut away at 72 to accommodate the bar 71, and this provides vertical shoulders 73 which register with the outer surface of the bar 71 when the upper part is in vertical alignment. FIGS. 15 and 16 show the parts in partially separated position, but when they are fully telescoped, the surface 72 rests against the top surface of the bar 71 and the shoulders 73 engage the outer surface of the bar 71 to lock the joint against inward buckling. Of course the inward buckling forces are of minor extent so that sufficient play between the parts can be provided to permit manipulation of the upper end of the part 37 incident to hooking the slot 42 over the lock 40 (FIG. 7).

As shown in FIG. 8, a hinged closure 74 may be provided for the pocket 32 so as to provide a continuous surface on which loading trucks can operate.

The collapsed parts may be locked in their storage position by means of a locking bolt 75 shown in FIG. 9 which extends through the pocket walls and through a rectangular slot 76 formed in the folded parts 33 and 37. The longitudinal axis of the slot 76 is horizontal so that the weight of the handle of the locking bolt will tend to maintain the parts in the interlocking position shown in FIG. 9.

To summarize the operation which has been pointed out in detail in connection with the various parts and subassemblies, when it is desired to collapse the load retainer from the operative position shown in FIGS. 1 and 4, first the lowermost rail 31 of each set of rails is disengaged first at its free end, and then at its head end, and lowered into its storage position in the pocket 32. The holders 60 in the pockets are preferably provided with cross pins similar to the cross pins 55, and corresponding enlarged portions similar to the enlarged portions 50. Then the second rail of each set is lowered into its storage position. Then the upper or channel part 37 of each standard is moved upwardly into the FIG. 15 position to clear the bar 71 of the joint lock, and then outwardly so as to disengage the same from the supporting lug 40, thus permitting the desired down folding movement shown in FIG. 6. Then the folded standard is rotated downwardly into the pocket 32, the locking bolt 75 inserted, and the closure 74 closed. After this procedure is repeated for each set of rails and each standard for a given door opening, the car is ready for unloading, and of course, in some instances, all doors will be opened and the intermediate door posts 27 removed or slid to the car ends.

After the car has been unloaded, the parts can remain in the collapsed position if the car is to be returned empty. When the car is loaded, the operation is repeated in the reverse order.

The bilaterally symmetrical shape for the lower part 33 permits the use of a single shape for either the left hand standard in FIG. 4, which cooperates with the head portions of two sets of rails, or the right hand standard of FIG. 4 in which the standard cooperates with the free end of one set of rails and the head end of another set. The difference between the slot means 34 and 35 is that the former is drilled at intervals to provide the enlarged slot portions 50, whereas the latter is fitted with the cross pins 55. However, a single shape can be used for both which simplifies manufacturing problems.

Furthermore, the nature of the free end support permits the door posts 27 or 28 to be used as vertical members of the system.

The foregoing features provide a system which has a wide latitude of use, for the reason that in a narrow opening, only one jointed standard 30 may be required, and this cooperates with the two adjacent door posts; whereas in wider openings, two or more jointed standards may be required. In either instance, a single shape is used for the lower part 33, and each of the slot means in the lower part 33 can be adapted for either head end or free end support with only minor changes.

Although only a preferred embodiment of my invention has been shown and described herein, it will be understood that various modifications and changes may be made in the construction shown without departing from the spirit of my invention as pointed out by the appended claims.

I claim:

1. A collapsible load retainer for a cargo carrier comprising means providing a pocket in the floor structure of the said cargo carrier, a pair of vertical standards extending upwardly from said pocket, one of said standards being slotted, a rail having a head end and a free end, the head end of said rail interlocking with and being received within said slot for vertically sliding movement between an elevated position and a storage position in which it is disposed within said pocket, and means to secure both ends of said rail to said standards in a predetermined elevated position, the slot of said slotted standard being provided with an enlarged slot portion providing a shoulder, the head end of said rail including a neck extending through said slot and a head located within said slot, said end securing means for the head end comprising a boss located on said neck adjacent to said head so that longitudinal displacement of said rail outwardly of said slot into a locking position will cause said boss to engage said shoulder, and said end securing means for the free end of said rail including means to maintain said rail in said longitudinally displaced locking position.

2. In a railway car or the like having pocket forming means in the floor structure of the car, and a roof structure, the combination of a collapsible load retainer comprising a pair of vertical members extending upwardly from said pocket, one of said vertical members being vertically slotted, a rail having a head at one end, the other end being a free end, the head of said rail being received within said slot and interlocking therewith for vertically sliding movement between an elevated position and a storage position in which it is disposed within said pocket, means to secure both ends of said rail to said vertical members in a predetermined elevated position, means for pivotally mounting the lower end of said slotted vertical member in said pocket so that said member may be swung downwardly into a storage position within said pocket and overlying said rail, and means connecting said vertical member to said roof structure for maintaining same in a vertical position.

3. A collapsible load retainer as claimed in claim 2 in which the other one of said vertical members comprises a door post of the car.

4. A collapsible load retainer as claimed in claim 2 in which said pivotal mounting means includes a shaft journaled in the walls of said pocket, a crank arm mounted on said shaft, and spring means acting on said crank arm for urging said standard into its upright position.

5. In a railway car or the like having a floor structure with a longitudinally extending pocket formed therein, and a roof structure, the combination of a collapsible load retainer comprising a pair of vertical standards extending upwardly from said pocket, one of said standards having a continuous slot extending from end to end thereof, a rail having a head at one end, the other end being a free end, the head of said rail being received within said slot for vertically sliding movement between an elevated position and a storage position in which it is disposed within said pocket, means to secure both ends of said rail to said standards in a predetermined elevated position, means pivotally mounting the lower end of said slotted standard in said pocket so that said standard may be swung downwardly into a storage position within said pocket and overlying said rail, and an extension pivotally mounted to the upper end of said slotted standard for engaging said roof structure when said standard is in its upright position, said extension being in the shape of a channel which embraces said standard when in a folded position to permit reception of said folded standard in said pocket.

6. A collapsible load retainer as claimed in claim 5 in which the slot of said slotted standard is provided with a series of enlarged portions providing shoulders, the head end of said rail including a neck extending through said slot, said end securing means for the head end comprising a boss located on said neck adjacent to said head for selective cooperation with one of said shoulders, and said end securing means for the free end of said rail comprising a hook mounted on said free end, the other one of said standards being provided with a series of pin means for selective engagement by said hook.

7. In a railway car or the like having a floor structure and a roof structure, a collapsible load retainer comprising a pair of vertical standards and a horizontal connecting rail having a head at one end, the other end being a free end, continuous slot means in one of said standards for slidably mounting the head end of said rail for vertically sliding movement, said head end interlocking with said slot means to prevent withdrawal of said rail from said slot means, pocket means located in the floor structure of said railway car providing a storage position for said rail, said slot means permitting vertical sliding movement between said storage position and an elevated position, and means for locking said rail in one of several elevated positions, one of said standards being a jointed standard and comprising an upper part and a lower part, said upper part being foldable over said lower part about an axis which is substantially parallel to the orientation of said rail, the lower end of said lower element extending into said pocket and being pivotally mounted therein whereby said jointed standard when folded may be rotated into a storage position within said pocket and overlying the storage position of said rail, and means for releasably connecting the top end of said upper part to the roof structure.

8. A collapsible load retainer as claimed in claim 7 in which said upper part is in the form of a channel, the flanges of said channel having closed slots at one end of said upper part, a hinge pin mounted at the upper end of said lower element and extending through said closed slots, said hinge pin and said closed slots cooperating to provide telescopic movement of said parts of a limited extent when the parts are in aligned position, whereby said upper part will overlap said lower part.

9. A collapsible load retainer as claimed in claim 8 which includes spring means for urging said jointed standard into its upright position to facilitate manipulation of said parts.

10. A collapsible load retainer as claimed in claim 8 in which said channel is oriented so that said overlapping arrangement will prevent outward buckling of said jointed standard, and a locking lug carried on said lower part and engaging a portion of said upper part when said parts are aligned and telescoped to prevent inward buckling of said jointed standard.

11. In a cargo carrier of the type having a floor structure and a transverse top structural member, a collapsible load retainer comprising two vertical standards extending between said floor structure and said top structural member, means providing a pocket in said floor structure for receiving said load retainer when collapsed, a plurality of vertically spaced horizontally extending rails connecting said standards, said standards each being provided with oppositely disposed vertically extending cavities and having continuous slots in its oppositely disposed surfaces which communicate with said cavities for receiving the end portions of said rails, means at one end of each rail permanently interlocked with one of the slots of one of said standards for vertically sliding movement in said slot, correspondingly located means on adjacent standards for locking each of said rails in vertically elevated spaced positions, said rails being movable between said vertically spaced elevated positions and a storage position in said pocket in which one of said rails overlies the other, and means for pivotally mounting the lower end of one of said standards in said pocket so that said standard may be swung downwardly into a storage position in said pocket overlying said rails.

12. In a cargo carrier of the type having a floor structure and a transverse top structural member a collapsible load retainer comprising a plurality of vertical standards extending between said floor structure and said top structural member, a plurality of sets of horizontal rails, at least one of said sets connecting two standards to each other, said standards being provided with two oppositely disposed vertically extending cavities and having continuous slots in the oppositely disposed surfaces of each standard which communicate with said cavities, each slot receiving the end portions of the rails of one set of rails so that each standard cooperates with two sets of rails, means providing a pocket in said floor structure for receiving said sets of rails, means at one end of each rail of each set permanently interlocked with one of the slots of one of said standards for vertically sliding movement in said slot, and correspondingly located means on adjacent standards for locking each of said rails in vertically spaced elevated positions, the rails of each set being movable between said vertically spaced elevated positions and a storage position in said pocket in which the rails of each set are stacked one above the other, and means for pivotally mounting the lower end of one of said standards in said pocket so that said standard may be swung downwardly into a storage position in said pocket overlying said stacked rails.

13. In a cargo carrier as claimed in claim 12, a collapsible load retainer including holders disposed at the ends of said pocket and beneath and in vertical alignment with said standards when extended, and being of similar cross section to said standards, and receiving the ends of said rails when stacked in said storage position.

References Cited by the Examiner

UNITED STATES PATENTS

| | | | |
|---|---|---|---|
| 832,588 | 10/06 | Bridges et al. | 105—381 |
| 838,739 | 12/06 | Nantz | 105—381 |
| 1,188,996 | 6/16 | Richardson | 105—381 |
| 1,400,140 | 12/21 | Callery | 105—381 |
| 2,827,000 | 3/58 | Tobin | 105—369 |
| 2,827,960 | 3/58 | Keating et al. | 105—369 |
| 2,932,262 | 4/60 | Keating et al. | 105—369 |
| 2,973,724 | 3/61 | Miller et al. | 105—369 |
| 3,053,549 | 9/62 | Mutto | 105—369 |

LEO QUACKENBUSH, Primary Examiner.